United States Patent [19]
Lea et al.

[11] Patent Number: 6,160,548
[45] Date of Patent: Dec. 12, 2000

[54] METHOD AND MECHANISM FOR SYNCHRONIZING HARDWARE AND SOFTWARE MODULES

[76] Inventors: Christopher B. Lea, 10453 Laurentides, Montreal-North, Québec, Canada, H1H 4V6; Raymond Hill, 65 Sherbrooke Est, App. 1719, Montréal, Québec, Canada; Adam D. Barr, 17908 NE. 106th Ct., Redmond, Wash. 98052

[21] Appl. No.: 08/842,552

[22] Filed: Apr. 15, 1997

[51] Int. Cl.[7] .............................. G06F 3/00; G06F 13/00; H04N 9/475

[52] U.S. Cl. ......................... 345/328; 348/512; 348/515; 348/516; 348/518

[58] Field of Search ........................... 345/328; 348/512, 348/513, 516, 518, 510, 522

[56] References Cited

U.S. PATENT DOCUMENTS

| | | | |
|---|---|---|---|
| 5,751,368 | 5/1998 | Cooper | 348/512 |
| 5,861,880 | 1/1999 | Shimizu et al. | 345/302 |
| 5,872,565 | 2/1999 | Greaves et al. | 345/328 |
| 5,917,482 | 6/1999 | Putnam | 345/328 |

*Primary Examiner*—Nathan Flynn
*Assistant Examiner*—Ngoc K. Vu
*Attorney, Agent, or Firm*—Gowling Lafleur Henderson, LLP

[57] ABSTRACT

A method and system for synchronizing modules associated with audiovisual devices, generally for use with a digital non-linear editor. A logical clock communicates information, including time and state (clock operating mode) information, to hardware and software modules through a synchronization port. The synchronization ports convert the time information into values recognizable by the module, and offset the time as needed to maintain synchronization. The state information may effect module commands for controlling audiovisual devices, such as rewind, playback and capture commands to tape players, timed such that various devices having different preparatory timing requirements are synchronized. State information, such as information indicating that a device is ready, may be returned by the modules. Video editing features such as scrubbing, looping and frame-stepping are supported by the mode information that is communicated between the clock and the synchronization ports.

44 Claims, 6 Drawing Sheets

| Step | CLOCK | SYNC MGR | SYNC PORT 1 | SYNC PORT 2 |
|---|---|---|---|---|
| 1 | Enter PREPLAY state | Notify registered syncports of PREPLAY state | | |
| 2 | Wait for all PREPLAY ready | Wait for all PREPLAYs registered = ready | Command connected module to rewind / thread tape | Command connected module to rewind / thread tape |
| 3 | | | | Call Ready (PLAY) |
| 4 | | | Call Ready (PLAY) | |
| 5 | | Notify Clock all PLAYs ready | | |
| 6 | Enter PREROLL state | Wait for target minus longest preroll time | | |
| 7 | | Notify Syncport 2 to begin preroll | | Command connected module to roll tape |
| 8 | | Wait for target minus other preroll time | | |
| 9 | | Notify Syncport 1 to begin preroll | Command connected module to roll tape | |
| 10 | Enter PLAY state | Notify registered syncports of PLAY state | | |
| 11 | Enter PRESTOP state | Notify registered syncports of PRESTOP state | | |
| 12 | Wait for all PRESTOP ready | Wait for all registered prestops = STOP ready | Command connected module to stop tape | Command connected module to stop tape |
| 13 | | | | Call Ready (STOP) |
| 14 | | | Call Ready (STOP) | |
| 15 | | Notify Clock all STOPs ready | | |
| 16 | Enter STOP state | | | |

FIG. 5

METHOD AND MECHANISM FOR SYNCHRONIZING HARDWARE AND SOFTWARE MODULES

FIELD OF THE INVENTION

The invention relates generally to the computer-based control of audiovisual devices, and more particularly to a method and mechanism for synchronizing hardware and software modules with respect to audiovisual devices.

BACKGROUND OF THE INVENTION

Digital nonlinear video editors are sophisticated tools which assist in the development of creative audiovisual productions. For example, a digital non-linear editor allows individual frames or clips of video from one or more sources to be individually edited and assembled into an elaborate video production. Audio can be combined therewith and modified as desired to produce a complete audiovisual production. One such digital nonlinear editor is described in U.S. patent application Ser. No. 08/771,447, filed Dec. 20, 1996 and assigned to the assignee of the present invention.

In general, the various audiovisual devices connected to a digital nonlinear video editor operate independent of one another. For example, a videotape player and an audio player may each have modules with time counters associated therewith, but provide no way to synchronize the counter of one with the counter of the other. Alternatively, the video player may not directly possess a time counter, but instead may be arranged to work with frames of information intended to be serially displayed at a predetermined frequency. Moreover, the starting point for one device may be offset from the starting point for another. For example, the desired video information for a video clip may begin at one-hour on the videotape while the desired audio information begins at thirteen minutes on its tape. Lastly, the time required for one device to rewind and/or thread a tape and begin prerolling the tape to stabilize itself for playback may be entirely different from the time needed by another device, such as a device that stores its information in high-speed RAM.

As a result of these myriad problems and others, synchronization of the various devices is difficult to accomplish and maintain. However, to be of any real value, a digital non-linear editor not only needs to start its connected devices precisely in synchronization, but must also be able to rewind, play and fast forward devices in regular, scrub, loop and step modes all while maintaining the precise synchronization. Moreover, in addition to synchronizing the various hardware modules, a desirable non-linear editor needs to provide a user-friendly interface which may include independent software modules, each of which also need to be precisely synchronized with each other and the audiovisual devices. A hardware-based device such as a black-burst generator provides a highly reference timing signal, but there is no way to get the devices to align with the signals.

OBJECTS AND SUMMARY OF THE INVENTION

Accordingly, it is a general objective of the present invention to provide a method and mechanism for synchronizing hardware and software modules.

A related objective is to incorporate the method and mechanism into a digital non-linear editor.

Another objective is to provide such a method and mechanism that are capable of synchronizing modules organized with different units, different offsets and/or different rewinding, threading or preroll requirements.

In accomplishing those objectives, it is a related objective to provide a method and mechanism as characterized above that facilitates synchronized playback in regular, scrub, loop and step modes.

Another objective is to provide a method and mechanism of the above kind that can align devices with an external hardware signal, while being relatively inexpensive, flexible and extensible to future developments.

Other objects and advantages will become apparent from the following detailed description when taken in conjunction with the drawings, in which:

BRIEF DESCRIPTION OF THE DRAWINGS

FIG. 5 is a flow diagram corresponding to the events in FIG. 4 and representing the steps taken by the clock, synchronization manager and the two exemplary synchronization ports to synchronize modules.

DETAILED DESCRIPTION OF THE PREFERRED EMBODIMENT

Figure 1:
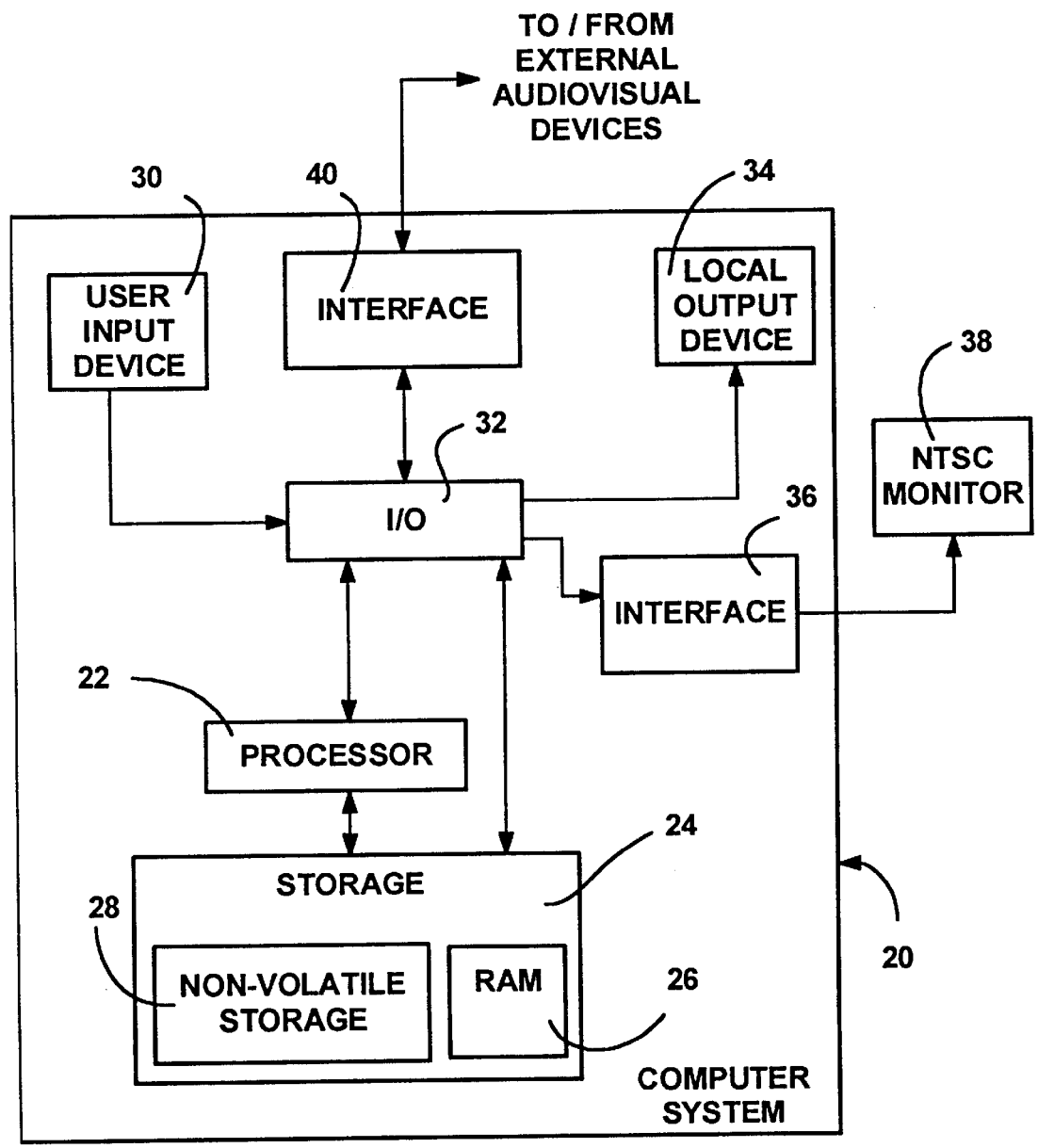
FIG. 1 is a block diagram representing a computer system in which the present invention may be incorporated.

Turning to the drawings and referring first to FIG. 1, there is shown a computer system generally designated 20 into which the present invention may be incorporated. The computer system 20 includes a processor 22 operatively connected to a storage 24, the storage including random access memory (RAM) 26 and non-volatile storage 28 such as a hard disk-drive, optical drive or the like. As can be appreciated, the non-volatile storage 28 can be used in conjunction with the RAM 26 to provide a relatively large amount of virtual memory via well-known swapping techniques.

The computer system 20 also includes at least one input device 30, typically a keyboard and/or a pointing device such as a mouse, connected through input-output circuitry (I/O) 32 for communicating user commands to the processor 22. Similarly, at least one local output device 34 such as a computer display monitor and speakers are connected to the I/O 32 for communicating information from the processor 22 to the user of the system 20. In addition to the computer monitor, the computer system 20 typically includes appropriate interface circuitry 36 for providing signals to an external high-speed digital television (e.g., NTSC) monitor 38. The external monitor 38 enables an author/editor to view a series of video frames with the rate, interlacing, aspect ratio and so on of consumer video equipment, so that the edited video accurately represents what the viewer will ultimately see.

Figure 2:
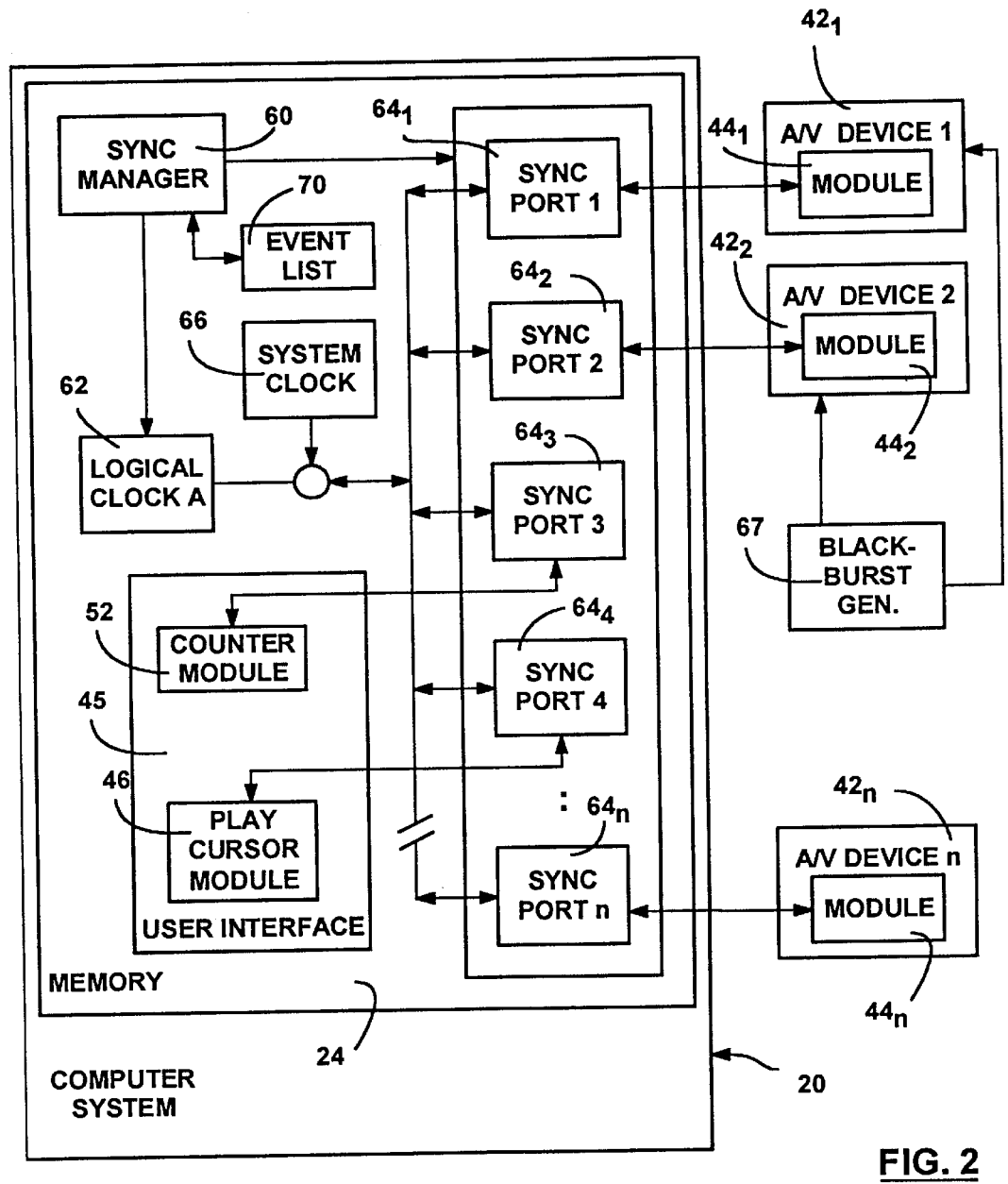
FIG. 2 is a block diagram representing components in the computer system storage and the devices connected thereto for implementing the present invention.

The computer system 20 also includes appropriate interface circuitry 40 for communicating with external audiovisual hardware devices $42_1$–$42_n$ (FIG. 2). For example, such devices $42_1$–$42_n$ may include videocassette recorders, laserdisc players, CD-ROM players and the like. Such devices are typically professional-quality machines, and thus are capable of receiving and precisely acting on commands (e.g., advance to a specified frame or relative time) and outputting status information (e.g., the machine is currently positioned at a specified frame or time). To this end, the devices $42_1$–$42_n$ include serial ports, local-area-network adapter cards or the like whereby such information may be passed to and from the computer system 20. In any event, such connections are known and are not described in detail herein. Each machine is thus considered to have a hardware and/or software module $42_1$–$42_n$ through which the information is exchanged with the computer system 20.

Figure 3:
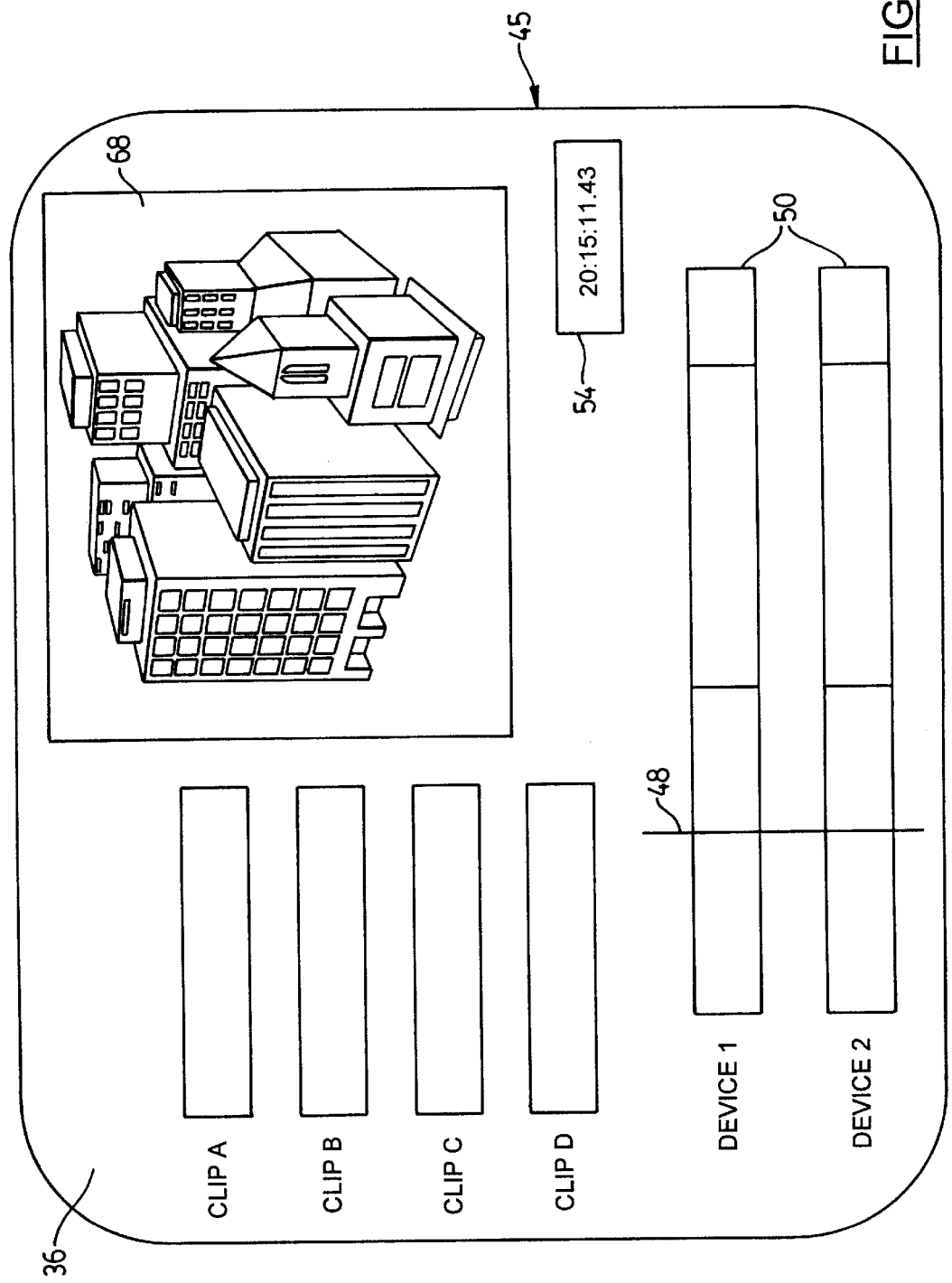
FIG. 3 is a simplified representation of a user interface for controlling certain components of FIG. 2.

In addition to modules on external machines, the present invention facilitates the synchronization of internal software modules. For example, as described in more detail below, in a user interface 45 of a digital non-linear editor, one software module 46 may generate a play cursor 48 (FIG. 3) on the computer display 34 which visibly indicates the overall position relative to a timeline 50 in an audiovisual presentation. Another module 52 may generate a time counter 54 (FIG. 3) on the display 36. The two modules 46, 52 are independent of one another, yet are synchronized in accordance with the present invention. Note that such internal modules may be considered equivalent to other audiovisual devices in that they provide the user-editor with audiovisual information corresponding to the audiovisual production being edited.

A number of aspects of the present invention are incorporated into a product known as Digital Studio, available from Softimage Incorporated. Softimage's Digital Studio product runs on a Microsoft Windows NT 4.0 platform and provides a sophisticated non-linear editor with a number of advanced editing features and capabilities, including the synchronization aspects of the present invention as set forth herein.

To accomplish the synchronization of the various modules, the computer system storage 24 includes a number of instantiated objects and persistent data for other objects as understood in object-oriented technology. As is known, objects are data structures that exhibit certain characteristics, including inheritance, polymorphism and encapsulation. Objects include methods and data, and thus the objects shown herein provide a number of methods that may be called on by the other objects for passing information to accomplish the synchronization.

In accordance with one aspect of the invention, as shown in FIG. 2, there is provided a synchronization manager 60 and at least one logical clock 62 for synchronizing the various modules $42_1$–$42_n$ and 46, 52. A logical clock 62 is a named object containing a high-resolution clock, preferably a 64-bit doubleword containing a tick count. As described in more detail below, the clock 62 has various states including running, stopped, fast, and step. It also has a scale indicating the speed at which it is running, with 1.0 indicating normal speed relative to a real-time clock. Negative numbers indicate that the clock 62 is running backwards, numbers between 0 and 1.0 indicate slower than normal, and numbers above 1.0 indicating faster than normal. By calling appropriate methods in the clock object, the scale can be changed and/or the clock 62 can be interrogated to obtain its running scale. Note that more than one logical clock may be defined, but generally only one is active at a given moment. Each logical clock can represent a device or a group of devices that share a common set of synchronization properties. However, for purposes of simplicity herein, generally only one logical clock will be described.

The clock object 62 includes the following data, with default values in parentheses, as set forth in the table below. pParent is a pointer to the parent synchronization manager 60 which created the clock object 62, and pszName is the name of the clock object 62:

```
: m__Name( pszName )
    , m__fState( SYNC__STATE__STOP )
    , m__fScrubState( SYNC__SCRUB__INACTIVE )
, m__dScale( 1.0 )
, m__llClockBaseTime( 0 )
, m__llClockBaseOffset( 0 )
, m__Clock()
, m__pParent( pParent )
, m__cClockRefs ( 0 )
, m__fLoopActive( LOOP__NO__LOOP )
, m__llLoopTimeIn( 0 )
, m__llLoopTimeOut( 0 )
, m__llPlayTimeIn( 0 )
, m__llPlayTimeOut( 0 )
, m__llPreRollOffset( 0 )
, m__llTargetTime( 0 )
, m__fTargetState( SYNC__STATE__STOP )
, m__mfTimeFormat( DSTIME__FRAME30 )
, m__llTicksPerFrame( 156800000 )
, m__fDelayPreRoll( FALSE )
, m__fClockActive( FALSE )
, m__fLoopRestart( FALSE )
```

The clock states include the states set forth in the following table:

| | |
|---|---|
| SYNC_STATE_STOP | The clock is inactive. |
| SYNC_STATE_PRESTOP | The clock is preparing to change to the STOP state. |
| SYNC_STATE_PLAY | The clock is active and the associated clients are expected to produce output. |
| SYNC_STATE_PREPLAY | The clock is preparing to change to the PLAY state. |
| SYNC_STATE_RECORD | The clock is active and the associated clients are expected to produce output. |
| SYNC_STATE_PREREC | The clock is preparing to change to the RECORD state. |
| SYNC_STATE_FAST | The clock is active at an accelerated rate (not enforced) but the associated clients are not expected to produce output. |
| SYNC_STATE_PREFAST | The clock is preparing to change to the FAST state. |
| SYNC_STATE_PREROLL | An intermediate state which can occur between a preparatory state and an active state. Clients that register for this state are assumed to require a period of running time to be able to be fully active at the desired time the active state is to begin and cannot be paused and restarted immediately. These clients are expected to set their Running PreRoll Time SetRunningPreRollTime) during the preparatory state. If a client cannot |

-continued

| | |
|---|---|
| | provide empirically a running preroll time (i,e, external tape devices), they must set their Running PreRoll Time to CDSTime::Undefined. When all clients have stated their readiness to move to the current active state, each client registered for the PREROLL state in turn will be notified of the PREROLL state when the clock has reached to the target time minus their stated running preroll time. When they are notified, the clock will be active. If a client has stated that their running preroll time is CDSTime::Undefined, their running preroll time will be set by the synchronization manager (prior to moving to the preroll state) to be the maximum of all other clients that require preroll support. In this case the clock is not active until this client (it is assumed that there will be only one of this type involved at any time) notifies the synchronization manager that the preroll state has been achieved (i.e. pSyncPort->Ready( SYNC_STATE_PREROLL)). |
| SYNC_STATE_STEP | The clock is inactive but the associated clients are expected to produce output whenever a new time is set (caused by the reassertion of the STEP state). When a client has finished their reqirements of the STEP state they state their readiness for the next STEP state by calling the Ready method on their respective SyncPort. |
| SYNC_STATE_POSTSTEP | A Secondary state that follows the STEP state. The implied semantics are that the STEP state is for rendering and the PEST state (post roll for STEP are for the UI updates required to follow the STEP state before the next STEP is asserted. The clock is inactive but the associated clients are expected to produce output whenever a new time is set (caused by the reassertion of the STEP state). When a client has finished their reqirements of the PEST state they state their readiness for the next PEST state by calling the Ready method on their respective SyncPort. |
| SYNC_STATE_PAUSE | The clock is inactive. Hardware devices differentiate between this and the STOP state but internal devices generally do not. |
| SYNC_STATE_PREPAUSE | The clock is preparing to change to the PAUSE state. |
| SYNC_STATE_SEEK | The clock is inactive (actually in the STOP state) and there is at least one client that is a "linear" device that requires SEEK support whenever a new time is set. When a client if just such a device it registers for the SYNC_STATE_SEEK notification and any time change notifications (SYNC_NTFY_TIME) will not be broadcast until all such devices have reached the seek "target" time. |
| SYNC_NTFY_TIME | A secondary state that can occur when the time changes while the clock is inactive. Used for notification purposes only. |
| SYNC_NTFY_PCHG | A secondary state that can occur when a property (e.g. time scale) changes. Used for notification purposes only. |
| SYNC_NTFY_SCRUB | A secondary state that can occur when the scrub state changes. Used for notification purposes only. |
| SYNC_NTFY_SEEK | A secondary state that can occur when the time changes while the clock is in the Seek State. Used for notification purposes only of time updates while in the seek state. |

Although not necessary to the invention, the clock 62 is named, allowing the simultaneous existence of multiple clock objects and differentiation therebetween by other software components. The naming of clocks also allows the various software components to connect to the clock in a standard manner.

As best shown in FIG. 2, the logical clock 62 connects to each module via a synchronization port $64_1$–$64_n$, each of which is also an object. The synchronization manager 60 opens synchronization ports and tracks the association of the ports with the named clock object 62, creating an instance of a named clock object if one does not already exist. Note that modules through their synchronization ports, may be connected to a plurality of clocks at one time. Each synchronization port $64_1$–$64_n$ allows the clock 62 to be viewed by its respective module using logical units specified by the module. For example one module might view the clock in seconds while another views the clock in video frames, but the underlying logical clock object 62 is the same. To this end, each synchronization port object $64_1$–$64_n$ includes methods for receiving unit information from the module connected thereto, receiving the clock tick value from the clock object, and for converting the received clock value into the appropriate value specified by the corresponding module. Note that the invention will operate with virtually any frame rate, including frame rates such as NTSC (29.97 frames/second), PAL (25 frames/second), film (24 frames/second) or any custom frame rate supported by an external device.

Each synchronization port $64_1$–$64_n$ also allows its corresponding module to view the clock 62 with different logical offsets. For example, the time counter module 52 may be displaying zero while a tape player has its tape positioned at one hour (as output by the module of the tape player). To accomplish the offset adjustment, the various methods of the synchronization port adjust the time values of the clock object 62 based on the offset values specified by its corresponding module (including the software modules controlled by the user of the non-linear program editor).

In accordance with another aspect of the invention, through the synchronization ports $64_1$–$64_n$, the modules $44_1$–$44_n$ and 46, 52 can receive notification of certain events, including when the state of the clock 62 changes, when the clock time or scale changes, or when a given state or time is reached by the clock 62. The modules specify those state changes and properties for which they desire notification to the synchronization manager 60 via their respective synchronization port. The modules can also choose to be notified of time changes in three different fashions, 1) when an absolute time is reached during a playback, 2) periodically during a playback (where the period is defined by the module), or 3) whenever the clock's time is changed while the clock is in a stopped state.

As described in more detail below, the clock 62 provides synchronization support to the otherwise independent modules. In general, synchronization is achieved by allowing the modules to query the clock 62 for its current time, state or the value of a property thereof. The modules $44_1$–$44_n$ and 46, 52 can also be notified of changes to these states or properties. The logical clock 62 runs in a free-threaded environment and thus allows for asynchronous access and notifications. As set forth below, the logical clock 62 in conjunction with the synchronization manager 60 maintains the current state, time, lists of clients, transition requests, notifications and other various properties needed to provide synchronization services to the modules.

In accordance with another aspect of the invention, there are provided clock preparatory states which enable hardware devices to physically transition between their own active and inactive modes. For example, when changing from STOP to PLAY, many tape players require time to rewind to a preroll point (and possibly thread a tape onto the heads) and begin rolling the tape (e.g., for stabilization purposes) before the players can properly output signals from the tape. To accomplish proper synchronization, when the clock 62 transitions from a stopped state to an active state, the clock 62 first enters a running transition state. For example, the transition state is known as PREPLAY when the inactive state is STOP and the clock 62 is transitioning to the active state of PLAY. The clock 62 enters a similar state known as PRESTOP when transitioning from an active state (such as PLAY) to STOP.

The preparatory state is indicated to all the modules connected via the synchronization ports. The preparatory states allow the various modules to prepare themselves for the next state. The modules $44_1$–$44_n$ and 46, 52 may take as long as they need to prepare themselves, and only when all of the modules have indicated via the synchronization ports that they are ready, will the logical clock transition itself and the modules connected thereto to the next state. For example, in the case of moving from STOP to PLAY via PREPLAY, only when the modules have properly transitioned to their own PREPLAY (or equivalent) states and have indicated this to their respective synchronization ports will the clock 62 move to the next state. Waiting for a device allows a tape player as much time as needed to rewind a tape to a proper preroll point, thread the tape on the heads, if necessary, and do whatever else it needs to prepare for playback. Of course, certain modules such as the play cursor 46 can instantly transition from stopped to play and can thus ignore or otherwise opt out of the preparatory state notification. Thus, an alternative to waiting for all synchronization ports to indicate a ready state is to have a selective registration and notification system, wherein only certain modules register for notification of a given preparatory state, and only those registered modules need to indicate their readiness before the next state is entered.

In any event, as can be appreciated, the preparatory states ensure that all of the modules start or stop at the same time, which is significant when synchronizing independent modules. Note that there is similar support when transitioning in the other direction. One example is given by the preparatory state PRESTOP, which is used to enforce that all devices have actually transitioned to being "stopped" before the clock 62 and its client modules can be considered to be in the STOP state.

Once the modules are done with their running preparatory state, the modules indicate this to the clock 62. The clock 62 then enters another state known as the PREROLL state. In particular, the PREROLL state allows a tape player to begin rolling its tape forward prior to actual playing or recording for stabilization purposes or the like. Note that in a typical scenario, the tape is rewound (and threaded onto the heads, if necessary) to a certain point (e.g., five seconds before the start point) during the PREPLAY state, and then rolled forward to an appropriate position during the PREROLL state as described below.

In order for synchronization to occur, prior to acknowledging their preparatory state to the logical clock, each of the various modules provides the clock with an indication of how long a running preroll is needed thereby to be in a stable running state at playback. This is accomplished by placing a value (time or number of frames) in a synchronization port attribute that can be read by the clock object. The synchronization manager 60 in conjunction with the logical clock 62 independently notifies each module of the PREROLL state at precisely the time requested before the running state is entered. By way of example, PLAY may be set to start at time 20 units (e.g., frames or seconds), referred to as the target time. Once all the modules have indicated that their PREPLAY state is done, the synchronization manager 60 will examine the various requested preroll times, if any, for the modules. Module A may have requested a preroll time of 4 units and module B a preroll time of 7 units. As a result, the synchronization manager will notify Module B of PREROLL state at time 13 units, and module A at time 16 units. In this manner, both modules are lined up to play precisely at time 20 units.

As an added feature, after the preplay states have been indicated, one of the modules can indicate that its preroll time is undefined. In such an instance, the synchronization manager 60 will allow that device to enter the PREROLL state first. Once that device is stable, the device informs the synchronization manager 60 of its current time setting. The module is made aware of the preroll requirements of the other modules and ensures that it notifies the synchronization manager 60 with enough time to notify all the other modules at their correct preroll times. By way of example, assume that first and second modules have preroll times of eight and five seconds, respectively, and that the target time is at twenty seconds (clock time adjusted for offsets). A third device with an undefined preroll time thus knows that it must notify the synchronization manager at least at time twelve (twenty minus eight) seconds. Once the third device is stable, it notifies the synchronization manager 60 of its current time setting, e.g., at nine seconds. The synchronization manager 60 thus knows that there are eleven seconds until the undefined module reaches the target time, whereby the first module is caused to start its preroll in three seconds (eleven minus eight) and the second module in six seconds (eleven minus five).

Another feature available with the present invention is that the logical clock 62 can periodically adjust its value using hardware other than the computer system's clock 66. This operation is referred to as chasing a clock, as the logical clock continually adjusts itself to match a hardware device's clock, such as the timecode on a videotape. Alternatively, a video black burst generator 67 generates a certain number of frames per second (e.g., 29.97 NTSC or 25 PAL) using a clock that is ordinarily far more accurate than the system clock 66 in a computer system. As such, the logical clock 62 may tend to drift from the timing of the video frames generated by the black burst generator 67, and thus synchronization to this more accurate clock is desirable.

To correct this drift, the appropriate synchronization port preserves the hardware device's time, (e.g., by converting a number of frames or a videotape timecode to a tick count).

Moreover, the synchronization port associates this time value with a timestamp from the computer system's system clock 66 so that the preserved time has a reference point from which the logical clock 62 can adjust itself. Later, using the preserved hardware time and the timestamp, the logical clock 62 determines what its own time was at that timestamp and then adjusts its current value based on any differences therefrom. As can be appreciated, for playback and capture operations, the present invention aligns the devices with this external signal whereby the internal or external hardware or software modules of the audiovisual devices are in synchronization.

As described above, video hardware is frequently based on frames, of which there are 29.97 per second for NTSC or 25 per second for PAL. Accordingly, commands to the video hardware are often based on a specific frame or a certain number of frames in the future. However, because of latencies inherent in a system, a command intended to be issued in one frame may not be actually issued in that frame. For example, if near the end of frame two the sychronization manager 60 issues a command to a synchronization port instructing a module to start its preroll in four frames, the command may not be received by the module until frame three has begun. In such an instance, the module will start its preroll at frame seven instead of frame six as intended by the synchronization manager 60.

In keeping with the invention, a device $42_1$–$42_n$ may indicate to the logical clock 62 when the start of a frame begins. To avoid the above-described problem, frame-related commands and other notifications are issued immediately after the start of the frame rather than at a random time within a frame, ensuring that such commands will be received while in that proper frame. In other words, notifications will not take place across a frame boundary.

Similarly, when capturing data into the system from a tape, the data may be received by different sources such as an audio board and a video board. The present system queries the various modules to determine the amount of advance notice each module needs to begin a capture. The tape is then queued up and started rolling, and its timecode chased as described above. At some point before each device's advance notice point is reached, the synchronization manager 60 waits for the start of a frame, queries the current tape timecode and determines from the modules of the capturing devices how far in advance the various captures should start. The multiple modules are then notified, by issuing to each module a relative frame offset (from this frame) that the module has indicated it needs to begin capture. In this manner, an arbitrary number of devices may begin their capture at exactly the same time.

By way of example, assume the audio board indicates it needs three frames to begin capture while the video board indicates it needs five frames. Immediately after the start of the ninth frame prior to the point where the tape will reach the frame to be captured, the synchronization manager 60 notifies the audio board to begin its capturing operation (including its advance operations) in six frames and the video board to begin its capturing operation in four frames. When the appropriate tape frame is reached (in nine frames), both capturing devices will have received the appropriate advance notice.

In keeping with the invention, the logical clock 62 can indicate its properties and the synchronization ports can query a property or ask to be notified whenever a property is changed. The synchronization manager 60 handles the notifications. One such clock property indicates when the system is in scrubbing mode. In scrubbing mode, the clock 62 is stopped but its value is regularly changed as a user-editor drags the play cursor 48 (FIG. 3) forward or backward on the timeline 50. Because of the rapidity of the time change, certain modules will not wish to participate in scrubbing, and will only update themselves based on the new time value when the play cursor 48 is released. For example, the video graphics board outputting a windowed image display 68 will not be able to keep up with the changes, and will thus not participate in scrubbing and will only update when scrubbing is complete. Such a module registers with the synchronization manager for notification of changes to the scrubbing property that it can avoid participation at times when scrubbing is active, and participate when scrubbing is inactive.

The synchronization manager also supports looping by communicating looping states and loop start and end boundaries between the synchronization ports and the logical clock 62. When looping is enabled on a clock, the synchronization manager repeatedly stops each device at the endpoint of the loop boundary, seeks the device back to the start of the loop, and sets the device running again. The loop boundaries are managed such that when a playback is to begin and the looping mode is enabled, the playback is guaranteed to begin somewhere within the boundaries. These boundaries can be modified during a playback such that if the end of the loop boundary is moved to before the current location of the playback, the loop will be restarted at the beginning of the loop. Additionally, if the start point of the loop boundary is moved to after (in time) the current location of the playback, the playback continues until it reaches the end of the loop boundary. The enabling/disabling of the loop mode can occur while a playback is in progress and the rules for modifying the loop boundaries hold when the loop mode is enabled.

The synchronization manager also supports a form of automated frame advance (i.e., stepping). When the logical clock 62 is in STEP mode, it will continuously transition between STEP and POSTSTEP states. These states are effectively preparatory states for each other. During the STEP state, the devices are instructed to move to the next frame and render all of the data required for output of this frame. During the POSTSTEP state, all of the secondary modules, including the user interface, are updated with the data from this rendered frame. All objects must acknowledge that they have finished with their work in the current state before the logical clock will transition itself and the clients to the following state. This mechanism allows for the guaranteed viewing of each frame one by one such that each is fully rendered, regardless of whether it may be rendered in real-time.

Figure 6:
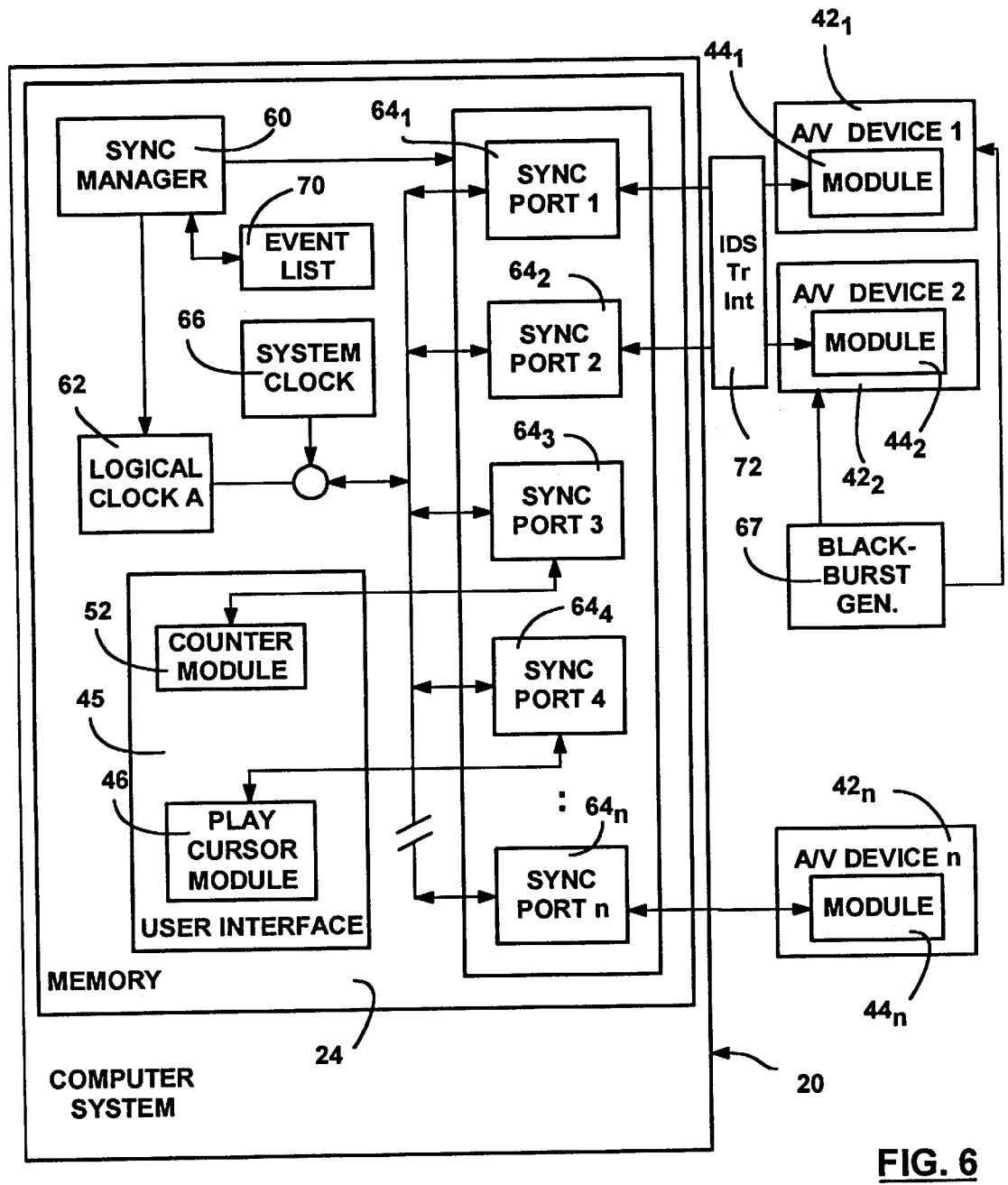
FIG. 6 is a block diagram representing components in the computer system storage including an alternative interface and the devices connected thereto for implementing the present invention.

Lastly, although not necessary to the invention, as shown in FIG. 6 an alternative system 20 can include a module interface known as an IDSTransport interface 72. The IDSTransport interface 72 provides a mechanism where modules can be ensured of a smooth, logical set of transitions to reach a desired target state. This is achieved by controlling the state transitions through a state machine. For example, certain devices cannot easily transition from fast forward to rewind without stopping the motors to change direction. Among other capabilities, the IDSTransport interface 72 manages the operating states of a device by assuming that a device cannot transition smoothly from moving in a forward direction to a reverse playback (and vice versa). The IDSTransport interface 72 detects this switch-of-direction condition and automatically performs the necessary state transitions to stop the playback, change the clock running scale to the opposite direction and restart the playback from where it left off. In contrast, a synchronization port is only capable of changing the scale factor, causing the changed value to be sent to the other synchronization ports, which may not be properly handled thereby.

The IDSTransport implementation 72 can be generally considered an enhanced synchronization port, i.e., an instance of an object having its own data. When using the same clock, as represented in FIG. 6, IDSTransport implementations are linked, and to some extent thus may be considered as shared by several modules. As described above, a synchronization port is ordinarily owned by only one module.

More particularly, the IDSTransport can be set with a specific context to work with. This context contains various timespans that have different meaning within different state contexts, e.g., the playback context may be defined by the extent of the material to be worked with along with the boundaries within which it can be worked. For example, material in a timeline may extend from time 2 to time 8, and thus be indicated by the current playback. However, the current context can allow for material to exist from time 0 to time 12, thereby representing the allowed device span (which is somewhat similar to a tape having a limited time thereon). There is also a loop span, and other spans such as those used to specify a certain span on the device for the current recording.

The IDSTransport includes a set of flags which determine which of these timespans need to be respected under which of these various states. The modules $44_2$ and $44_3$, which are the clients of the IDSTransport interface 72, can be notified of changes to this context. Such changes include the set of state notifications and periodic time notifications described above with respect to the synchronization ports. Moreover, the IDSTransport interface 72 broadcasts the existing notifications in an appropriate manner for receipt by user-interface related objects such as transport buttons, counters and the like. The IDSTransport interface 72 also manages the acknowledgements, the state initiation and transitions for this group of user interface elements.

The IDSTransport interface 72 provides other features, including a mechanism where a new target position can be set from which the current playback will continue. During a playback, if a new time is set in the IDSTransport interface 72, the IDSTransport interface 72 will ensure that the new target time will be reached, and also that the running state that the logical clock 62 was in (at the moment of the time change request) will be restarted. Similarly to the scale change described above, the IDSTransport 72 detects an abrupt time change in the clock, and realizes that certain modules may not be able react properly thereto. The IDSTransport 72 thus stops all modules, changes the clock while they are stopped, and then restarts all of the modules.

The IDSTransport interface 72 further provides various forms of enhanced playback. More particularly, the IDSTransport interface 72 supports the specification of various timespans which can be used to specify the boundary conditions under which various enhanced playback requests should operate. For example, a specification known as a Selection Play causes a playback to occur within the timespan that represents the current selection span.

Timespan enhanced playback is generally provided to allow a user to select a region of material and have the playback restricted to this region. One such example is for a user to select a region of interest and then, through a user command, preview this selected region from beginning to end with the loop mode (and/or the step mode) optionally turned on. Timespan enhanced playback is also useful for effects. For example, the user selects an effect, and then instructs the system to preview the material at the portions where this effect is involved.

For timespan enhanced playback, the IDSTransport interface 72 automatically sets the clock to the start time, plays it, stops the clock at the end, moves it back to the start, and so on, all based on one command issued by its module. Enhanced playback is done by calling the PlayEx ( ) method on IDSTransport. Note that if the Play ( ) method is called, it will generally be like calling Play ( ) on the synchronization port, (i.e., the clock moves to SYNC_STATE_PLAY after prerolling and so on). However, with PlayEx ( ), certain types of play can be specified. For example, PlayEx(DS_TRANSPORT_CAPTURE_PLAY) tells IDSTransport that the clock is being played in order to perform a capture from tape, so that a device or module can modify its behavior as necessary.

Figure 4:
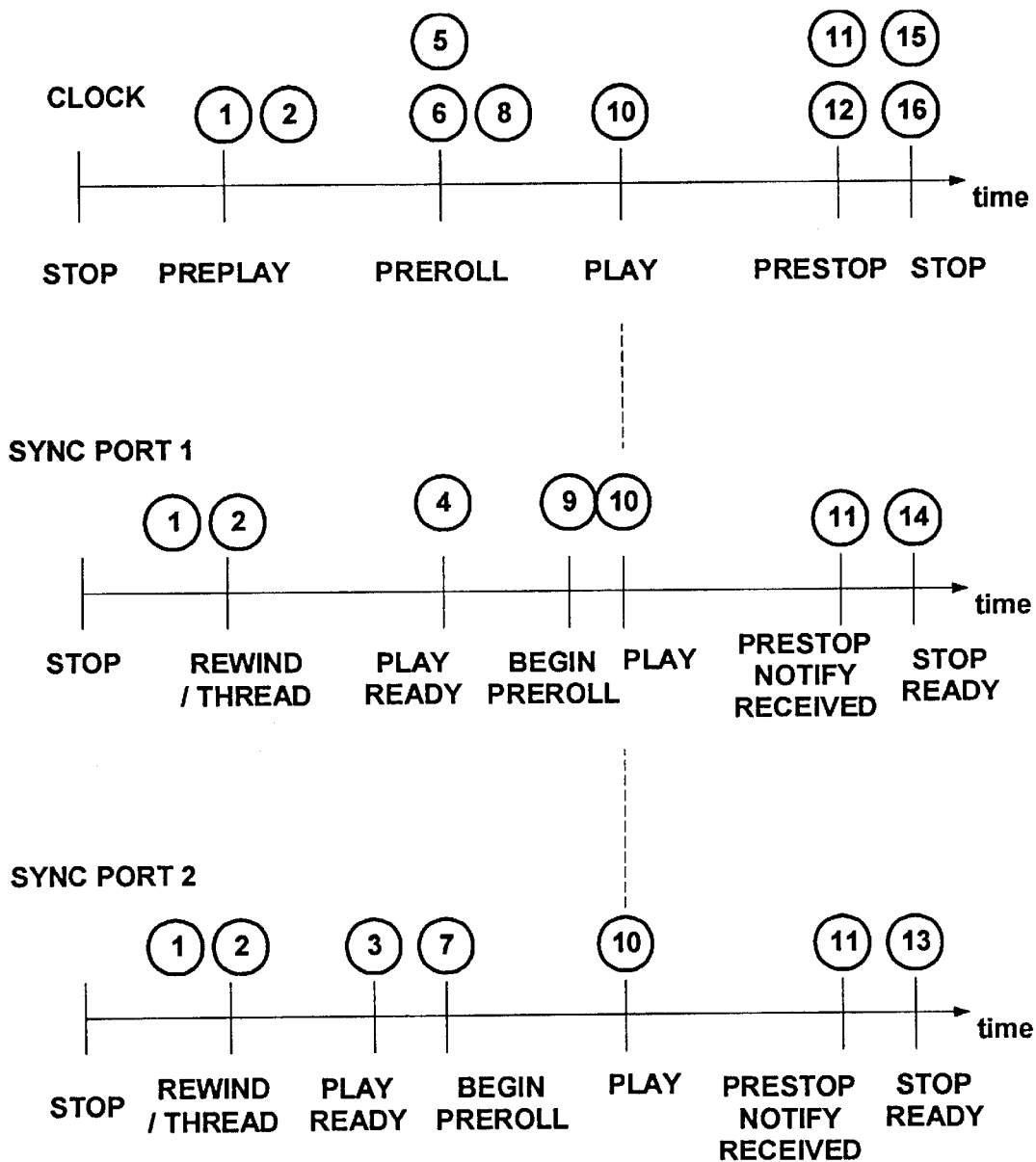
FIG. 4 is a timeline of events for a clock and two exemplary synchronization ports operating in accordance with one aspect of the present invention.

Turning to an explanation of the operation of the invention with particular reference to FIGS. 4 and 5, the following example describes the synchronization of two tape players according to the present invention. At this time, it is assumed that the logical clock and synchronization ports have been created by the synchronization manager, and that the synchronization manager has been informed of the notifications that each synchronization port wishes to receive.

As shown in the timing diagram of FIG. 4, the clock object is initially in a stopped state. At step 1, the clock enters the PREPLAY state, such as in response to a user command. As a result, the synchronization manager notifies the synchronization ports which have registered for preplay notification that the clock is now in PREPLAY. In response to the notification, at step 2 the synchronization ports provide information to their respective connected modules, whereby an appropriate action is taken by the corresponding hardware device. In this instance the modules control tape players, and thus the action taken by each module is to rewind, and if necessary, thread the tape. Note that if present, the counter module 52 and play cursor module 46 would not have their respective synchronization ports $64_3$, $64_4$ register for preplay (or preroll) notification since these modules can effectively change to a PLAY mode instantaneously.

At this time, the clock and synchronization manager are waiting until all appropriate synchronization ports have indicated their readiness to continue. Thus, as represented in FIG. 4, no action is taken at step 3 when the synchronization port 2 has indicated Play ready (the synchronization port 2 has called one of its methods, Ready (SYNC_STATE_PLAY)), because at this time the synchronization port 1 is not ready. However, at step 4, synchronization port 1 indicates its readiness by calling its Ready ( ) method with the value SYNC_STATE_PLAY. Since this is the last synchronization port registered for preplay notification, at step 5 the synchronization manager 62 informs the clock that all modules have indicated their readiness, i.e., have completed their preplay operations.

As a result, at step 6 the clock enters its preroll state. As described above, the preroll state is ordinarily used by tape machines to begin rolling their respective tape for stabilization purposes. The synchronization manager determines the target time from an event list 70, subtracts the preroll times (previously provided by the respective synchronization ports during the preplay state, before the module via its synchronization port indicated ready) from this time, and determines the preroll notification time for each syncport.

This time is also added to the event list 70. At step 6, the synchronization manager waits for the clock to achieve the first preroll time, i.e., the longest of the two syncport preroll time requirements.

At step 7, the clock has achieved this first preroll time, and thus the synchronization manager notifies the appropriate synchronization port, synchronization port 2, to have its connected module begin its preroll operation. The module complies at step 7 by causing the hardware to roll the tape.

At step 8, the synchronization manager is waiting for the clock to achieve the next preroll time according to the time requirement provided by synchronization port 1. When the clock 62 achieves this time, the synchronization manager notifies synchronization port 1 to begin its preroll operation. The associated module complies at step 9 by causing the hardware to roll the tape. At this time, the system waits for the logical clock to reach the target (play) time. No notifications back from the synchronization ports are needed to continue, and the next event will be triggered when the clock reaches the target time.

The target time is reached at step 10, whereby those synchronization ports registered for this notification are notified. Note that if present, the counter module 52 and play cursor module 46 would receive notification via their respective synchronization ports $64_3$, $64_4$, whereby these modules would begin periodically updating the display based on a period of time provided to the synchronization manager. For example, the PLAY cursor may be registered for notifications of the clock time once per second, while the counter module may register for one-tenth of a second updates.

In any event, at some time later a STOP command is received, such as when the clock has reached the out time of a loop. As a result, at step 11 the clock enters its prestop state to inform the (registered) synchronization ports and modules that they should begin their stop operation. Since prestop operates like the preplay state, steps 12–16 are not described in detail herein, except to again note that the clock does not stop until all registered modules have indicated their readiness to stop.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system connected to at least one audiovisual device, a system for synchronizing at least two modules, comprising:
    a memory,
    a plurality of synchronization ports provided in the memory for communication with respective ones of said modules,
    a logical clock provided in the memory, and
    means for communicating information between the logical clock and the synchronization ports, the information including time information from the logical clock and status information provided to the synchronization ports by the respective modules,
        wherein each said synchronization port is configured to provide the time information to each said respective module and to provide the status information to the logical clock for synchronizing the at least two modules.

2. The system of claim 1 wherein at least one of the modules is a software module in the memory of the computer system.

3. The system of claim 1 wherein at least one of the modules is a module connected to an audiovisual device.

4. The system of claim 1 wherein the synchronization ports and the logical clock are objects which communicate with each other by calling methods.

5. The system of claim 1 wherein the logical clock includes a plurality of states, including a running state and a stopped state, and wherein the information communicated between the logical clock and the synchronization ports includes the state of the logical clock communicated to the synchronization ports.

6. The system of claim 5 wherein another of said logical clock states is a preplay state.

7. The system of claim 5 wherein another of said logical clock states is a prestop state.

8. The system of claim 1 wherein at least one of the synchronization port includes means for converting the time information from the logical clock into a number of frames.

9. The system of claim 1 wherein the logical clock information is communicated as a tick count.

10. The system of claim 9 wherein at least one of the synchronization ports includes means for converting the tick count from the logical clock into a time value including minutes and seconds.

11. The system of claim 1 wherein at least one of the synchronization port includes an offset value and means for converting the time information from the logical clock into a time adjusted by the offset value.

12. The system of claim 1 wherein the logical clock includes means for running at different rates, and wherein the logical clock communicates a value indicative of its current running rate to the synchronization port.

13. The system of claim 1 wherein the logical clock includes means for receiving time information from an audiovisual device, and the logical clock further includes means for adjusting the time information therein based on the time information received from the audiovisual device.

14. The system of claim 13 wherein the time information received from an audiovisual device includes a timestamp of a system clock, and wherein the logical clock further includes means for adjusting the time information therein based on the timestamp.

15. The system of claim 1 further comprising notification means connected to the logical clock and the synchronization ports, the synchronization ports including means for registering information with the notification means, and the logical clock includes means for providing status information to the notification means, wherein the notification means receives status information from the logical clock and selectively communicates the status information to the synchronization ports that have registered for such status information.

16. The system of claim 15 wherein at least one module selectively registers with the notification means for selective notification of the preplay state.

17. The system of claim 15 wherein at least one module selectively registers with the notification means for selective notification of the preroll state.

18. The system of claim 1 wherein the synchronization port provides information to the module to temporarily disable a corresponding audiovisual device connected thereto when the logical clock is in a certain state.

19. The system of claim 18 wherein the synchronization port disables a corresponding audiovisual device connected thereto when the logical clock indicates a scrubbing mode of operation.

20. The system of claim 1 including means for continually returning the clock from a later time value to an earlier time value, causing at least one audiovisual device to continually playback in a loop from the earlier time value to the later time value.

21. The system of claim 1 wherein the logical clock includes means for advancing a time value corresponding to a single frame of video information.

22. The system of claim 1 further comprising an interface for detecting state transitions and for controlling the clock in response to detection thereof.

23. The system of claim 1 further comprising means for generating frame start and frame end information having a duration therebetween, wherein the logical clock includes means for receiving the frame start and frame end information and means for communicating the status information at a time within the duration that is relatively closer to the frame start than to the frame end.

24. A method for synchronizing first and second modules associated with respective first and second audiovisual devices, the devices having different preparation times from one another, comprising the steps of, determining a target time, communicating time and state information from a logical clock of a computer system to a first synchronization port associated with the first module, converting the state information into information for operating the audiovisual device associated with the first module, and communicating time and state information from the logical clock to a second synchronization port associated with the second module, the state information received by the modules at different times corresponding to the different preparation times of their respective audiovisual devices such that the devices achieve the target time in synchronization.

25. The method of claim 24 wherein the first and second audiovisual devices are tape players, and wherein the step of determining a target time comprises the steps of communicating a first value indicative of a first preparation time from the first module to the logical clock object and communicating a second value indicative of a second preparation time from the second module to the logical clock object.

26. The method of claim 25 wherein the first and second audiovisual devices are first and second tape players, respectively, and wherein the steps of communicating time and state information from the logical clock to the first and second synchronization port further comprises the steps of outputting information corresponding to a preplay state for rewinding the tape players, waiting for a response from each of the first and second modules, and after receiving the responses from the modules, outputting information corresponding to a first preroll state for starting playback of the first tape player to the first module at a first time based on the target time and the first preparation time, outputting information corresponding to a second preroll state for starting playback of the second tape player to the second module at a second time based on the target time and the second preparation time, whereby each tape player achieves a predetermined location on a tape therein at the target time.

27. The method of claim 24 wherein the first audiovisual device is a tape player and the second audiovisual device corresponds to a software module in the computer system for providing a timing display on an output device of the computer system, and wherein the step of determining a target time comprises the step of communicating a value indicative of a preparation time from the first module to the logical clock object.

28. The method of claim 24 wherein the first audiovisual device is a tape player, and wherein the step of communicating time and state information from the logical clock to the first synchronization port further comprises the steps of outputting information corresponding to a first state, waiting for a response from the first module, and outputting information corresponding to a second state after receiving the response.

29. The method of claim 28 wherein the first state corresponds to a preplay state for rewinding the tape player, and the second state corresponds to a preroll state for starting playback of the tape player, the tape player achieving a predetermined location on a tape therein at the target time.

30. The method of claim 24 further comprising the step of converting the time information from the logical clock into a number of frames.

31. The method of claim 24 wherein the logical clock information is communicated as a tick count, and further comprising the step of converting the tick count from the logical clock into a time value including minutes and seconds.

32. The method of claim 24 further comprising the step of, in at least one of the synchronization ports, converting the time information from the logical clock into a time adjusted by an offset value.

33. The method of claim 24 wherein the logical clock includes means for running at different rates, and further comprising the step of communicating a value from the logical clock indicative of its current running rate to the synchronization port.

34. The method of claim 24 further comprising the steps of communicating time information from an audiovisual device to the logical clock, and adjusting the time information in the logical clock based thereon.

35. The method of claim 34 wherein the time information received from an audiovisual device includes a timestamp of a system clock, and further comprising the step of adjusting the time information in the logical clock based on the timestamp.

36. The method of claim 24 further comprising the steps of receiving at the logical clock frame start and frame end information having a duration therebetween, and communicating the status information from the logical clock at a time within the duration that is relatively closer to the frame start than to the frame end.

37. The method of claim 24 further comprising the step of receiving status information from the logical clock indicative of a certain state of operation therein, and selectively disregarding subsequent logical clock information until the logical clock indicates a different state of operation.

38. The method of claim 24 further comprising the steps of registering via the synchronization ports for status information with a notification means, providing clock status information to the notification means, receiving status information at the notification means from the logical clock and selectively communicating the status information to the synchronization ports that have registered for such status information.

39. The method of claim 38 wherein the step of registering for status information includes the step of registering with the notification means for selective notification of the preplay state.

40. The method of claim 38 wherein the step of registering for status information includes the step of registering with the notification means for selective notification of the preroll state.

41. The method of claim 24 further comprising the step of disabling an audiovisual device when the logical clock indicates a scrubbing mode of operation.

42. The method of claim 24 further comprising the step of continually returning the logical clock from a later time value to an earlier time value to cause at least one audiovisual device to continually playback in a loop from the earlier time value to the later time value.

43. The method of claim 24 further comprising the step of providing an interface for detecting state transitions and for controlling the clock in response to detection thereof.

44. The method of claim 24 further comprising the steps of generating frame start and frame end information having a duration therebetween, receiving the frame start and frame end information at the clock, and timing the communication of status information from the clock such that the communication occurs closer to the frame start than to the frame end.

* * * * *